3,389,101
REDWOOD EXTRACT SUBSTITUTED-PHENOLIC
RESIN ADHESIVE
Reino A. Jarvi, Bellevue, Wash., assignor to Simpson
Timber Company, Seattle, Wash., a corporation of
Washington
No Drawing. Filed July 30, 1965, Ser. No. 476,196
6 Claims. (Cl. 260—17.2)

ABSTRACT OF THE DISCLOSURE

A resin adhesive for use in the manufacture of exterior grade plywood is formulated from a redwood extract, composed of phenolics solvent extracted from redwood, and phenol co-reacted with formaldehyde in the presence of an alkali hydroxide catalyst.

This invention relates to resin adhesives and more particularly to such adhesives adapted for use in the manufacture of exterior grade plywood.

Commonly-used resin adhesives in the manufacture of exterior grade plywood have phenolic or phenolic derivative basis. These resins typically have a resin solids content of about 40%, and seldom as high as about 50%. Resin adhesives of this type have a relatively high moisture content which results in blistering or "blows" in the plywood unless a relatively long plywood pressing time at relatively low temperatures is employed to minimize steam generation in the glue lines.

These resin adhesives also necessitate the use of a relatively high concentration of sodium hydroxide, on the order of between about 6–8% to achieve the required viscosity of 500–800 cps. inasmuch as high molecular weight phenolic resins are typically used. This results in a weaker plywood due to degradation of fiber strength by the sodium hydroxide.

A primary object of this invention is to provide an improved phenolic resin adhesive. Another object is to provide an improved adhesive with an increased resin solids content such that moisture problems are reduced. A further object is to provide such an adhesive with a longer assembly time than can be employed with phenolic resins presently in use. Another object is to provide such an adhesive that permits utilization of bark flour as an extender or filler to reduce the wet spread weight and to assist in elminating problems caused by the moisture content of the adhesive. Still another object is to provide such an adhesive that uses a lower percentage of sodium hydroxide than is employed with presently used phenolic resin adhesives.

These and other objects and advantages will become apparent from the following discussion.

Although the improved adhesive of this invention will have primary utility for fabricating exterior grade plywood, it is also suitable for fabricating interior grade plywood, partical board, and other materials requiring a laminating type adhesive.

The phenolic resin adhesive of this invention is obtained by removing extractives from redwood lumber or wood, not bark, by acetone, methanol or hot water solvent extraction and are composed essentially of phenolics. The acetone and methanol extractions remove principally tannis and phlobaphenes, and the hot water extraction removes principally the tannins. Suitable redwood material includes green redwood lumber, chips or sawdust. The extract is recovered as the portion remaining after the solvent and part of the water is stripped out by distillation. An extract solution containing up to 75% solids may be obtained. It has been found that the acetone redwood extracts are especially superior substitutes for phenol in producing an adhesive. Extractions containing a substantial amount of starches and hemi-cellulose material have been found to be unsuitable because such material dilutes the resin solids content of the extract and in addition does not properly react in the formulation of the adhesive.

In the preferred resin adhesives, which includes an acetone or methanol redwood extract, it has been found that up to about 75% of the phenol may be replaced by the redwood extractive solids, and a substitution of about 30% is preferred. When the adhesive is employed in the fabrication of exterior grade plywood, a maximum substitution of about 50% is preferred. When the adhesive is employed in the fabrication of interior grade plywood, up to 75% substitution has been found satisfactory.

It has also been discovered that the resin adhesives of this invention containing redwood extract enables the use of redwood or Douglas fir bark flour as an extender in the production of a glue mix. Numerous attempts have been made to use bark flour in 40% solids resins and have not been successful heretofore because of the resulting reduction in "pot Life" and assembly time.

The resin adhesives of this invention consist essentially of the co-reaction of redwood extractives and phenol with formaldehyde using an alkali hydroxide catalyst to form a condensation polymer. Contrary to the extractives from hemlock bark or the lignin fractions obtained from sulfate wood pulping processes, no special base phenolic resin need be prepared prior to reaction with the redwood extract. The use of hemlock extract and the lignin portions has been found to require the preparation of a highly methylolated water-soluble phenolic resin prior to introduction of these materials into the reaction. The redwood extract may be charged directly to a resin kettle with phenol and formaldehyde at the start of the reaction. Both methanol-free formaldehyde and inhibited formaldehyde containing up to about 10% methanol have been employed. Stabilized uninhibited 37% formaldehyde solution is preferred. The final viscosity of the finished resin can be varied from 500 to 2,000 cps. An initial viscosity of about 600 cps. is preferred for best all-around performance plus adequate storage life. Resins produced in accordance with this invention may have a 50% solids content with better properties than known 40% solids resin.

Preparation of the resin adhesives of the invention or of the bark flour extended glue mix does not require the use of a bodying agent such as "Methocel" which has been required in some known adhesives, and in fact it is preferred that bodying agents not be used with the adhesives of this invention. Further, the glue mix does not require the use of amylaceous material such as starches to produce a "hold out" effect as have some known glue mixes.

Example 1.—Preparation of resin from extract

The preferred embodiment of the invention is shown in the following charge:

| | Pounds |
|---|---|
| Phenol | 70 |
| Redwood extract (75% solids) | 40 |
| Uninhibited formaldehyde, (37%) | 165.3 |
| 30% caustic soda solution | 20 |
| Water | 1.5 |
| | 296.8 |

The phenol, redwood extract, formaldehyde, water, and one-half the 50% caustic soda solution are charged to a resin kettle. Reaction is carried out at 176 degrees Fahrenheit until a viscosity of 275 cps. is reached. (Viscosity is measured at 70° F. with Gardiner-Holt bubble tubes.) At this point, the batch is cooled to 160° F., and the remaining one-half of the caustic soda solution is added. Reaction is continued at 160° F. until a viscosity of 600 cps. is reached. At this point, the batch is cooled rapidly to less than 70° F. to arrest the reaction.

The resin has the following properties:

Viscosity _____ 600–1000 cps. @ 70° F.
Solids _____ 50–51%
NaOH content _____ 2.80% ±0.20%
Specific gravity _____ 1.191–1.197 @ 70° F.
Dry rubber _____ 9–12 seconds @ 300° F.
Free formaldehyde _____ 0.8 ±0.2%

The resin of Example 1 can be made into a plywood glue which will bond a five-ply 13/16-inch fir plywood panel in seven (7) minutes at a hot press temperature of 300° F. Assembly time may vary from three (3) minutes to thirty (30) minutes, using veneer of 0 to 5 percent moisture content. Spread weight on 1,000 square feet of double glue line may be as low as 48 pounds on 3/16-inch core. Under these conditions, an average of 95 percent wood failure was obtained in the Douglas Fir Plywood Association's exterior boil shear plywood test. The mixing directions for this glue are as follows:

| | Pounds |
|---|---|
| Water (195° F.) | 658 |
| Redwood bark flour | 300 |
| 50% caustic soda solution | 210 |

Mix 3 minutes @ 200° F.

| | |
|---|---|
| Soda ash | 60 |
| Diesel oil | 6 |

Mix 20 minutes @ 200° F. Then cool to 160° F.

| | |
|---|---|
| Resin of Example 1 | 1,000 |

Mix 15 minutes @ 120°–160° F.

| | |
|---|---|
| Soluble blood powder dissolved in | 50 |
| Water | 150 |
| Deformer | 4 |

Mix and cool to 45° F.

The viscosity of the prepared glue will range between 50 and 400 poises. The *neat* resin solids of the glue size is 19.6 percent. The "total resin solids" are 20.7 percent.

Example 2.—The following resin is made using equal amounts of redwood extract solids and phenol

| | Pounds |
|---|---|
| Phenol | 50 |
| Redwood extract (75% solids) | 66–2/3 |
| 37% formaldehyde solution | 165–1/2 |
| 30% NaOH solution | 26 |
| Water | 1.6 |
| | 309.6 |

All of the phenol, redwood extract, 37% uninhibited formaldehyde, and water is charged to the resin kettle. Sixteen pounds of 50% NaOH solution is added, and the charge is carefully brought to 176° F. When a viscosity of 275 cps. is reached, the charge is cooled to 160° F., and the remaining ten pounds of 50% NaOH solution is added. The resin is further reacted at 160° F. until a viscosity of 600 cps. is reached. At this point, the resin is cooled rapidly to less than 70° F. Properties of the above resin are shown.

| | |
|---|---|
| Viscosity, cps. | 600–1,200 |
| Solids | 50.41 |
| NaOH content, percent | 3.14±0.2 |
| Specific gravity | 1.219 |
| Dry rubber, seconds | 11 |
| Free formaldehyde, percent | 4.6±0.2 |

The pressing schedule for the adhesives of Examples 1 and 2 with Douglas fir bark extender are compared to a commercially available Douglas-fir bark-extended resin in Table I.

TABLE I

Press Temperature, 300° F.
Pressure, 172–200 p.s.i.
Maximum Assembly Time, 30 min.
Minimum Assembly Time, 5 min.
Minimum Spreads:
  1/10″ core—45–51 lbs./1,000 sq. ft. double glue line
  1/8″ core—45–51 lbs./1,000 sq. ft. double glue line
  3/16″ core—51–54 lbs./1,000 sq. ft. double glue line

| Panel Thickness, inch | No. Plies | No. Panels per Opening | Adhesives of Examples 1 & 2, min. | Commercially available Douglas fir bark-extended resin, min. |
|---|---|---|---|---|
| 1/4 | 3 | 2 | 4 | 5 |
| 3/8 | 3 | 2 | 6 | 7 |
| 9/16 | 5 | 1 | 5 | 6 |
| 11/16 | 5 | 1 | 6 | 7 |
| 13/16 | 5 | 1 | 7 | 8 |

It has been found that a preferred range of useful proportions of formaldehyde and sodium hydroxide in relation to redwood extract and phenol is as follows: 127 to 254 parts by weight of formaldehyde solution per 100 parts by weight of redwood extract plus phenol; and 8.5 to 30 parts by weight of sodium hydroxide solution per 100 parts by weight of redwood extract plus phenol.

While redwood bark flour is the preferred extender for the resins of this invention, other bark flours can be used. Redwood bark is preferred because it allows further extension of the resin than is possible with Douglas-fir bark flour. On the basis of 300 pounds of bark flour and 1,260 pounds of resin, the Douglas-fir bark will give 2,386 pounds of exterior glue whereas redwood bark will yield 2,711 pounds of glue. Use of redwood bark allows reduction of resin content from 1,260 pounds to 1,000 pounds on the above basis without losing the exterior glue bond. This is not possible with Douglas-fir bark. When using Douglas-fir bark flour, it has been found that the resin solids of the glue mix should be about 26.3 percent. When redwood bark flour is used, the resin solids of the glue mix can be as low as 20.7 percent. The redwood bark flour can be used with soluble blood to give a glue that has at least 30 minutes assembly time. Douglas-fir bark and blood combine to give a glue with about 25 minutes maximum assembly time. Blood is used to the extent of 10 percent based on resin solids according to the allowable limits for proteinaceous material in a phenolic resin exterior glue specified by the Douglas Fir Plywood Association. Bark flour in this glue mix may be used in proportions of 250 to 350 pounds.

Following is a comparison of two glues utilizing redwood bark flour versus one using a commercially available Douglas-fir bark flour. All of the glues are exterior grade made from a phenol-aldehyde type resin in which 30 percent of the phenol has been replaced by redwood extract solids.

| | Commercially Available Douglas-fir Bark Flour | Redwood Bark Flour | Redwood Bark Flour |
|---|---|---|---|
| Water | 483 | 767 | 408 |
| Bark Flour | 300 | 300 | 300 |
| 50% NaOH | 210 | 210 | 210 |
| Soda Ash | 60 | 60 | 60 |
| Diesel Oil | 6 | 6 | 6 |
| No. 31 Deformer | 4 | 4 | 4 |
| Soluble Blood | 63 | 50 | 63 |
| Resin | 1,260 | 1,000 | 1,260 |
| | 2,386 | 2,397 | 2,711 |
| Percent Resin Solids | 26.3 | 20.7 | 23.2 |

The red wood bark flour of this invention can be described as 95% through 100 mesh with 50% through 200 mesh. Coarser screen sizes can be used but may result in an adhesive that has an excessive degree of thixotrophy. The whole bark has been used as a source of bark flour.

The redwood extractive glue mixes described above with bark extenders have an assembly time of up to 45 minutes if blood is used and up to 4 hours without blood whereas known glue mixes having a 40% resin soluble content have an assembly of only between about 5 and 20 minutes.

What is claimed is:

1. A phenolic adhesive resin comprising the reaction products of (a) redwood extract extracted from redwood by a solvent selected from the group consisting of acetone, Methanol and water and (b) phenol, co-reacted with formaldehyde in the presence of an alkali hydroxide catalyst.

2. An adhesive resin according to claim 1 including a bark flour extender.

3. An adhesive resin according to claim 1 wherein redwood extractive solids are substituted for up to about 75% of the phenol.

4. An adhesive resin according to claim 1 wherein redwood extractive solids are substituted for between about 30% to 50% of the phenol.

5. An adhesive resin according to claim 1 including a redwood bark flour extender.

6. An adhesive resin according to claim 1 wherein said redwood extract is solvent extracted by acetone.

References Cited

UNITED STATES PATENTS

| | | | |
|---|---|---|---|
| 2,380,214 | 7/1945 | Burrell | 260—17.2 |
| 2,675,336 | 4/1954 | Stephan | 260—17.2 |
| 2,781,327 | 2/1957 | Ayers et al. | 260—17.2 |

FOREIGN PATENTS

| | | |
|---|---|---|
| 597,019 | 4/1960 | Canada. |
| 723,884 | 2/1955 | Great Britain. |
| 927,454 | 5/1963 | Great Britain. |

OTHER REFERENCES

Chem. Abstract 48: 14190 i, Barton et al., Pulp Paper Mag. Can. 55, No. 10, 132–7 (1954).

WILLIAM H. SHORT, *Primary Examiner.*

E. M. WOODBERRY, *Assistant Examiner.*